Nov. 4, 1941.  M. ANNICK  2,261,205
CAMERA
Filed Nov. 25, 1938  5 Sheets-Sheet 1

INVENTOR
MICHAEL ANNICK
BY
Ward, Crosby & Neal
ATTORNEYS

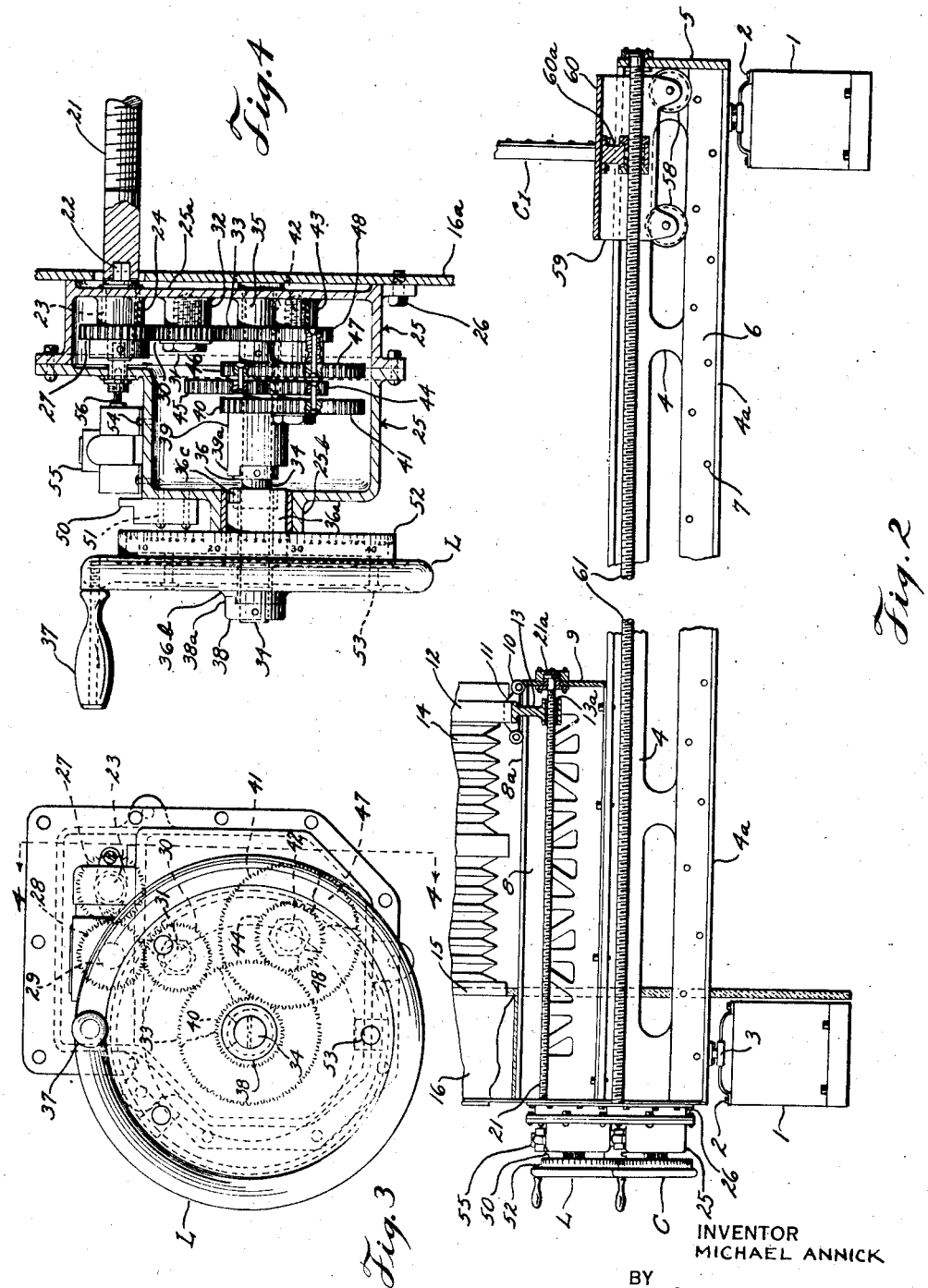

Nov. 4, 1941.                M. ANNICK                 2,261,205
                              CAMERA
                        Filed Nov. 25, 1938            5 Sheets-Sheet 3
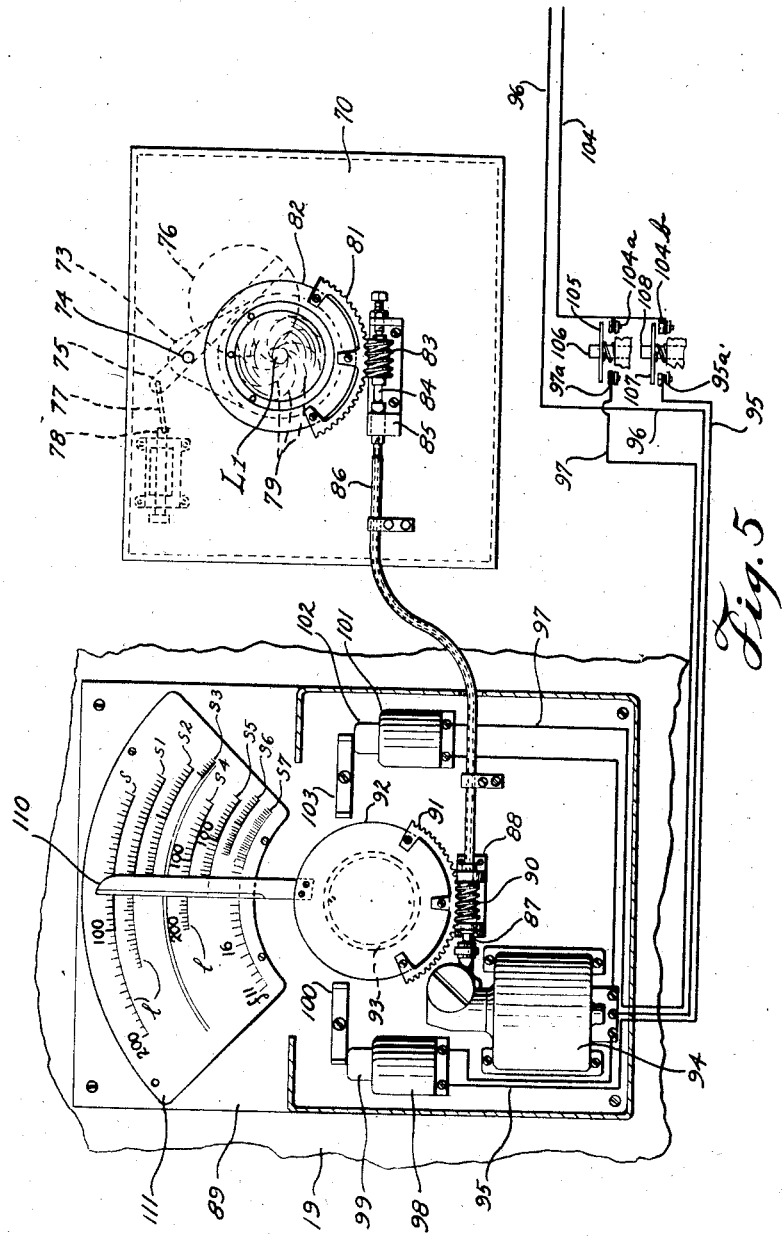
INVENTOR
MICHAEL ANNICK
BY
Ward, Crosby & Neal
ATTORNEYS

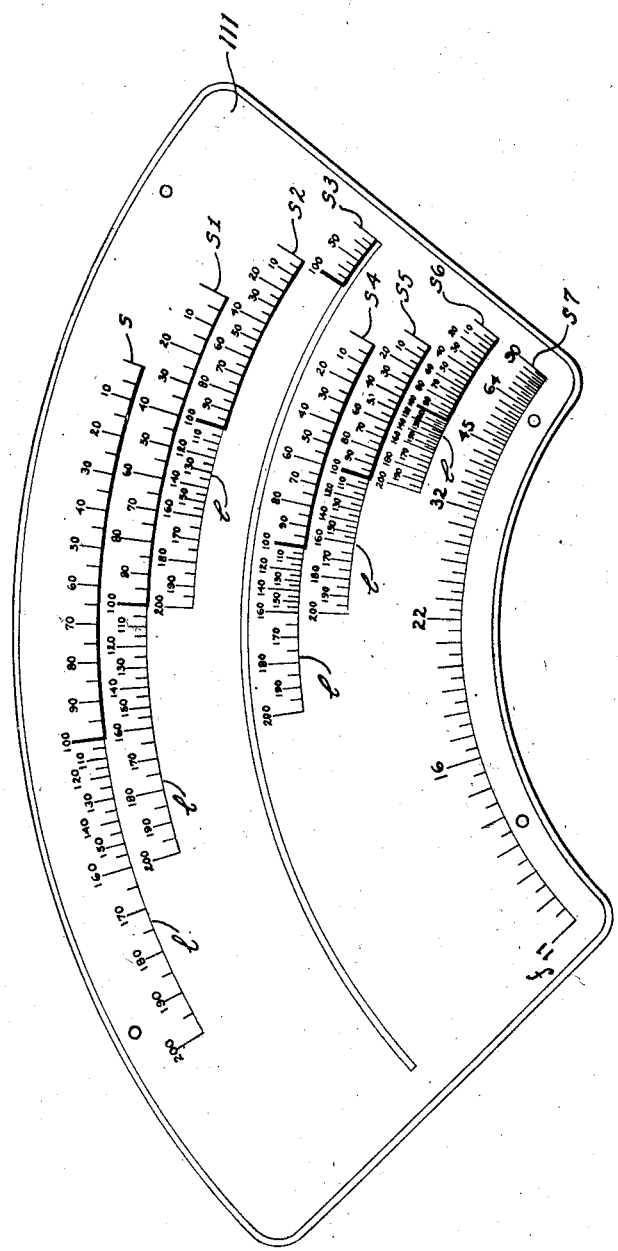

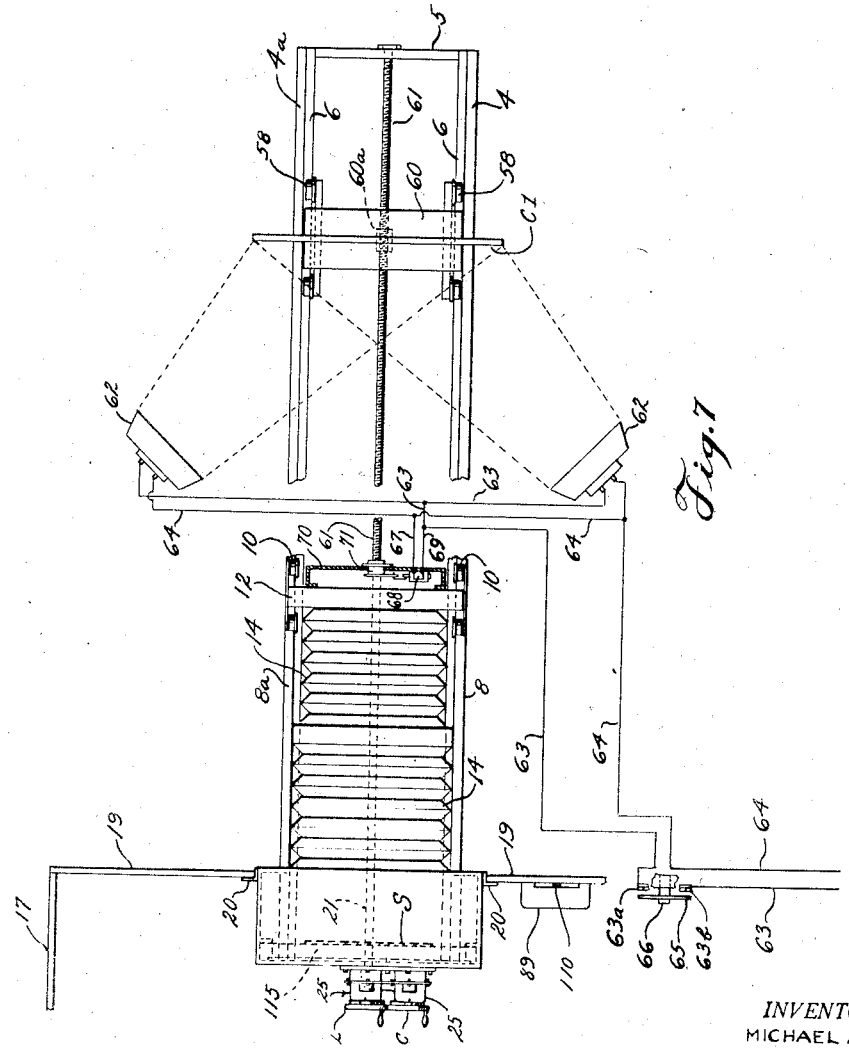

Patented Nov. 4, 1941

2,261,205

UNITED STATES PATENT OFFICE 2,261,205

CAMERA

Michael Annick, Rutherford, N. J., assignor to General Printing Ink Corporation, New York, N. Y., a corporation of Delaware Application November 25, 1938, Serial No. 242,135

12 Claims. (Cl. 88—24)

My invention relates to cameras adapted particularly for high-speed, precision operation.

My invention has further reference to novel focusing arrangements for cameras and, still further, my invention relates to novel camera control systems and to automatic arrangements for varying the camera diaphragm opening in an advantageous manner.

Various other objects, advantages and features of my invention will become apparent from the following detailed description.

For an understanding of my invention and for an illustration of one of the forms thereof, reference is to be had to the accompanying drawings, in which:

Fig. 2 is a vertical sectional view, partly in elevation, of the camera shown in Fig. 1;

Fig. 3 is an enlarged elevational view showing my novel speed-changing mechanism;

Fig. 4 is a vertical sectional view, partly in elevation, taken on the line 4—4 of Fig. 3 looking in the direction of the arrows;

Fig. 5 is a diagrammatic view illustrating a diaphragm control arrangement;

Fig. 6 is an elevational view of a chart;

Fig. 7 is a plan view, partly diagrammatic, showing features of my novel camera; and Fig. 8 is an enlarged plan view, partly in section, showing features of the invention.

Figure 1:
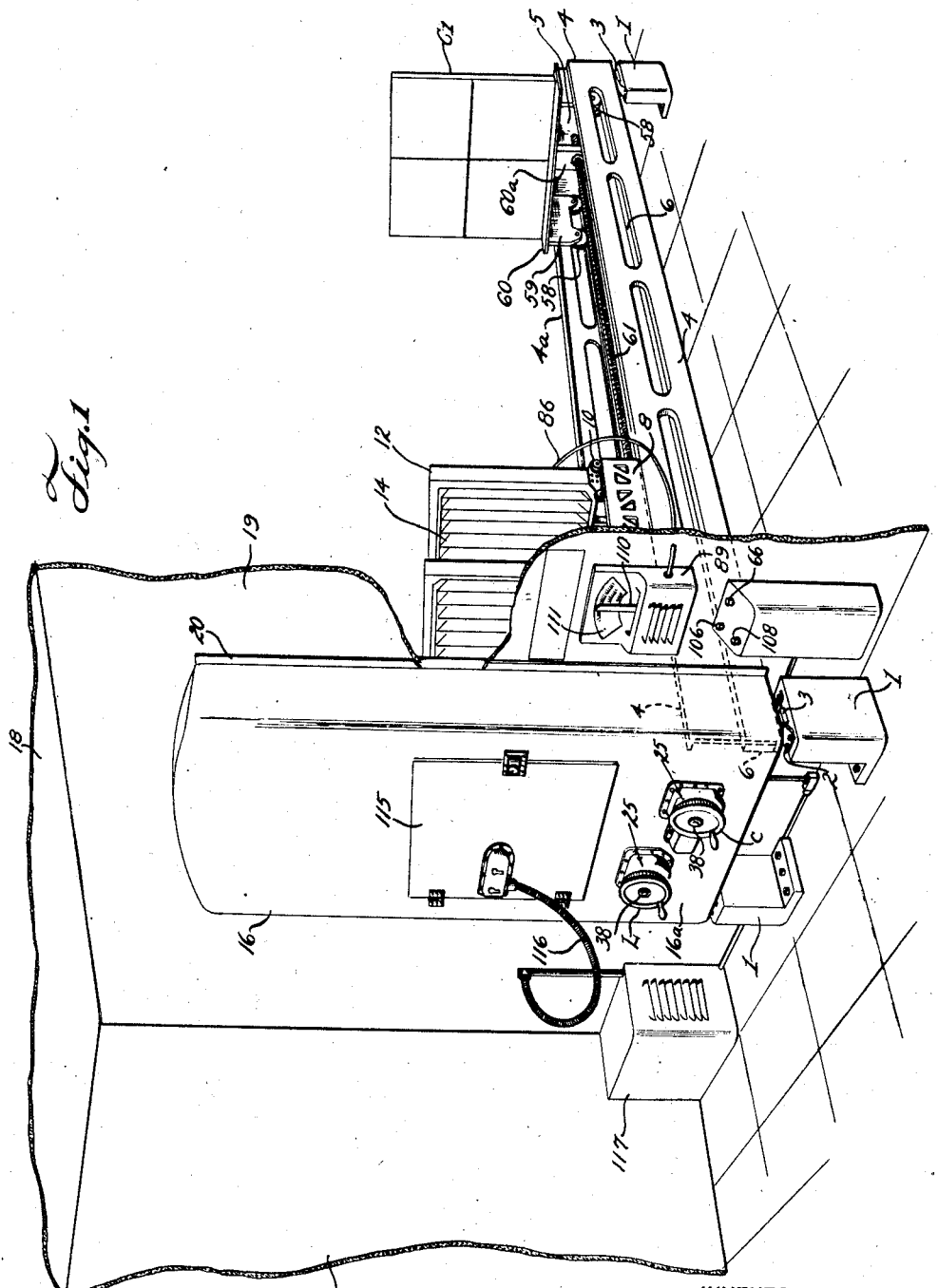
Figure 1 is a perspective view showing the camera of my invention.

In Figs. 1 and 2, I have illustrated a suitable supporting structure adapted to rest upon or to be secured to the floor or other horizontal surface. In the example shown, this supporting structure comprises a plurality of spaced standards 1, the top surface of each having suitably secured thereto, as by the bolts 2, a cushion mounting 3. At one side of the camera, a pair of these standards 1 and associated cushion mountings 3 support a channel member 4 and, at the other side of the camera, the other pair of standards 1 and associated cushion mountings 3 support a similar channel member 4a, the channel members 4 and 4a being disposed and maintained in parallel relation by end members 5 which are welded or otherwise suitably secured to the respective channel members 4, 4a. As indicated in Fig. 2, each of the aforesaid channel members 4, 4a carries a horizontal track member 6, the track members 6 being disposed in parallel relation and suitably secured to the respective channel members 4, 4a by bolts 7, or equivalent.

Bolted or otherwise suitably secured to the upper surfaces of the channel members 4 and 4a are the respective channel members 8 and 8a to which cross members 9 are welded so as to form a rigid frame. Preferably, the top surfaces of the channel members 8, 8a are machined so as to form suitable track surfaces. Movable upon each of said track surfaces is a truck structure comprising a pair of wheels 10, each pair of which is secured to a plate 11, the plates 11 being secured to opposite sides of and forming a support for a vertical, rectangular frame 12 having its lower surface suitably secured to a transverse strut 13 which, intermediate its ends, comprises a depending section 13a having an internally threaded passage extending horizontally therethrough.

One end of a bellows structure 14 is secured in suitable manner to the aforesaid movable frame 12, the other end of said bellows structure 14 being suitably secured to an open rectangular frame 15 secured, in turn, to the front wall of the camera box 16 which may be welded or otherwise suitably attached to adjacent surfaces of the aforesaid channel members 4, 4a, 8 or 8a.

In accordance with usual practice, the camera box 16 should be disposed in a dark room such, for example, as may be formed in part by fixed, opaque walls 17, 18 and 19, the wall 19 being disposed closely adjacent and substantially parallel with respect to the front wall of the camera box 16, said wall 19 being provided with an aperture corresponding in configuration substantially with the border of the camera box 16 and suitable light-trapping members 20 being used to prevent the passage of light through the relatively narrow space existing between the wall 19 and the camera box 16.

As hereinafter more fully described, the aforesaid frame 12 serves indirectly as a support for the objective lens L1 of the camera. Therefore, in order to move this objective lens to various focusing positions as desired, it is necessary to impart movement to said frame 12. This, in accordance with the invention, is accomplished in a novel manner.

As hereinbefore stated, the strut 13, with which the frame 12 is movable, comprises a depending section 13a having an internally threaded passage, this passage, as shown in Fig. 2, receiving an externally threaded shaft 21 having one end rotatably supported in a suitable bearing formed in the adjacent cross member 9, the end of the shaft 21 which is thus supported comprising a flanged section 21a which coacts with adjacent surfaces of the bearing to prevent endwise movement of the shaft. The other end of the shaft 21 is suitably connected, as by a key-and-slot connection 22, Fig. 4, to a shaft 23 which is rotatably mounted in a bearing boss 24 formed integrally with the front wall 25a of a housing 25 suitably secured, as by bolts 26, to the rear wall 16a of the camera box 16.

Referring to Fig. 4, the above noted shaft 23 has secured thereto for rotatable movement therewith a gear wheel 27 which meshes with a gear wheel 28, Fig. 3, rotatable on an axle 29 which is supported by a boss, not shown, projecting laterally from the wall 25a of the aforesaid housing 25. The gear wheel 28 meshes with a gear wheel 30 supported on an axle 31 carried by a boss 32 which projects laterally from said housing wall 25a. The gear wheel 30 meshes with a gear wheel 33 secured to and rotatable with a shaft 34 journaled at one end in a boss 35 projecting laterally from said wall 25a. The shaft 34, adjacent its other end, is disposed within the hub 36a of a wheel L having an actuating crank handle 37, the center of said wheel L coinciding with the center of the shaft 34 and the wheel hub 36a being slidable axially with respect to the shaft 34. The wheel hub 36a is journaled in a bearing 25b of the housing 25, said wheel hub 36a being slidable in this bearing in a direction axially of the shaft 34. The shaft 34, at its extreme end adjacent the wheel L has pinned or otherwise suitably secured thereto a collar 38 which comprises a tongue 38a extending parallel with the shaft 34 and adapted to engage, in clutching relation, within a groove 36b formed in the adjacent hub section of said wheel L.

The hereinbefore described hub 36a of the wheel L comprises a groove 36c within which is adapted to engage a tongue 39a of a sleeve 39 loosely mounted on the shaft 34 and restrained from movement toward the left, Fig. 4, by a collar 36 pinned to said shaft 34. The sleeve 39 has secured thereto for rotatable movement therewith a gear wheel 40 which meshes with a gear wheel 41 freely rotatable on an axle 42 supported by a boss 43 projecting laterally from the housing wall 25a. The gear wheel 41 is secured, for rotatable movement therewith as a unit, to a gear wheel 44 loosely mounted on said axle 42, said gear wheel 44 meshing with a gear wheel 45 loosely mounted on the aforesaid shaft 34. The gear wheel 45 is secured, for rotatable movement therewith as a unit, to a gear wheel 46 which, likewise, is loosely mounted on said shaft 34, said gear wheel 46 meshing with a gear wheel 47 loosely mounted on the aforesaid axle 42. The gear wheel 47 is secured, for rotatable movement therewith as a unit, to a gear wheel 48 which, likewise, is loosely mounted on the axle 42, the gear wheel 48 meshing with the hereinbefore described gear wheel 33.

For convenience of assembly, the casing 25 may be formed from a plurality of casing sections which, as shown in Fig. 4, are bolted or otherwise suitably secured together. The vertical wall of the rear casing section may have a pointer or indicating member 50 suitably secured thereto, as by the screws 51, the operative section of this indicating member 50 coacting with a scale formed on the peripheral surface of a circular band 52 which, by screws 53, or equivalent, is secured to the aforesaid wheel L.

As herein shown, the upper surface of the outer casing section has secured thereto, as by the screws 54, a counter mechanism 55, the operating shaft 56 which is connected by a key-and-slot connection 57 with the adjacent end of the aforesaid shaft 21 which, if desired and as shown in Fig. 4, may have a bearing surface in the adjacent housing surface.

With the wheel L positioned as shown in Fig. 4, the tongue 38a of the collar 38 is in engagement with the wheel groove 36b and the sleeve tongue 39a is disengaged from the wheel groove 36c. Accordingly, when the operator rotates the wheel L in a selected direction, the shaft 34 is rotated to thereby rotate the gear wheel 33 from which power is delivered to the gear wheels 30, 28, 27 in succession. As a result, rotative movement is imparted to the shaft 21 and the latter, by reason of the threaded connection to the strut 13, effects movement in the desired direction of the frame 12. The latter serves as the support for the hereinafter described objective lens and, accordingly, the latter is thus moved at least approximately into proper focusing position. In connection with the operation described immediately above, it will be understood that the described rotation of the gear wheel 33 effects rotation of the sleeve 39 through the train of gear units shown in Fig. 4. At this time, however, the sleeve 39 merely idles on the shaft 34.

The ratios of the gear wheels described immediately above are such that the described rotation of the wheel L effects rotation of the shaft 21 at relatively high speed. When it is desired to rotate the shaft 21 at relatively low speed in order to precisely position the objective lens in its desired focusing position, the operator moves the wheel L axially of the shaft 34 to thereby disengage the tongue 38a from the wheel groove 36b and to effect engagement of the tongue 39a with the wheel groove 36c. Thereafter, when the operator rotates the wheel L in a selected direction, the sleeve 39 is rotated to thereby rotate the gear wheel 40, the gear wheels 41 and 44 as a unit, the gear wheels 45 and 46 as a unit, the gear wheels 47 and 48 as a unit, and then the hereinbefore described gear wheel 33 from which power is delivered to the shaft 21 by way of the mechanical connection previously described. The ratio of the gear wheels included in the last described train of gears is such that the described rotation of the wheel L effects rotation of the shaft 21 at relatively low speed and, accordingly, it becomes practical to precisely position the objective lens in its desired focusing position.

When the objective lens has thus been properly positioned, the operator may move the wheel L to an intermediate position wherein both of the tongues 38a and 39 are disengaged from their respective grooves. When this has been done, the objective lens is locked in its intended position and may not be moved therefrom even though the wheel L should be rotated.

Preferably, the top surfaces of the hereinbefore described track members 6 are machined for the reception of the respective truck structures shown in Figs. 1 and 7, each of these truck structures comprising a pair of wheels 58, each pair of said wheels 58 being secured to a plate 59 and the plates 59 being suitably secured to a cross member 60 which serves as a support for a copy board C1 disposed in a vertical plane. The cross bar 60, intermediate its ends, comprises a depending section 60a having an internally threaded passage extending horizontally therethrough. Extending horizontally and longitudinally throughout the length of the machine is an externally threaded shaft 61 which is in threaded engagement with the threads of said passage in the section 60a.

Except in length, the shaft 61 is a duplicate of the hereinbefore described shaft 21 and this shaft 61 may be mounted in the same manner as previously described with respect to said shaft 21. The shaft 61, when rotated, serves to adjust the position of the copy board C1 in the same sense and in the same manner as rotation of the shaft 21 serves to adjust the position of the objective lens L1. In accordance with the invention, the shaft 61 is rotated by a wheel C, Fig. 1, which is a duplicate, both structurally and functionally, of the aforesaid wheel L. Moreover, there intervenes between the wheel C and the shaft 61 a speed-changing mechanism which is a duplicate of the speed-changing mechanism intervening between the wheel L and the shaft 21 as hereinbefore described in detail and as shown in Figs. 3 and 4. Inasmuch as these speed-changing mechanisms are of duplicate character, the description of one hereinbefore stated will suffice for the other.

As well understood in the art, the copy board C1 is adapted to have suitably attached thereto a member, not shown, carrying a representation of which an image is to be formed on the sensitized surface of the camera.

As shown in Fig. 7, a plurality of suitably supported electric lamps 62, 62 are indicated as operatively positioned to cast light upon the aforesaid representation-carrying member. One set of corresponding terminals of the lamps 62 are connected by a conductor 63 while the other set of corresponding terminals of said lamps 62 are connected by a conductor 64, the conductor 63 including the spaced switch contacts 63a, 63b and then extending to one terminal of a suitable source of current, and the conductor 64 extending to the other terminal of said source of current.

The switch contacts 63a, 63b are adapted to be closed by a suitable switch member 65 having an actuating button 66, this switch member being biased in suitable manner, as by spring-action, toward circuit-opening position.

Connected to the conductor 64 is a conductor 67 which leads to one terminal of an electro-magnetic winding 68, Figs. 7 and 8, the other terminal of which is connected by a conductor 69 to the aforesaid conductor 63. As shown, the winding 68 is suitably secured to a lens-carrying member 70 which, by welded joints or otherwise, may be secured to the aforesaid frame 12, Fig. 7. The member 70 is provided with a central aperture in which is received the barrel 71 of the camera objective lens L1, this barrel 71 being suitably secured in fixed position, as by the plates 72, Fig. 8, which may be riveted to said member 70. Projecting from the lens barrel 71 is a lug 73, Fig. 5, which carries a pin 74 on which is pivoted an arm 75 having secured thereto a lens shutter 76. The end of the arm 75 opposite the lens shutter 76 has secured thereto a link 77 which is connected to the electro-magnet armature 78.

Referring to Fig. 5, I have shown conventional members 79 which form the shutter mechanism for defining the diaphragm opening of the objective lens L1. The shutter members 79 may be opened or closed to a desired extent by a segmental rack member 81 secured by screws or otherwise to an oscillatory ring 82 rotatable on the lens barrel 71 and adapted to actuate said shutter members 79 in a conventional manner.

Coactable with the rack member 81 is a worm gear 83 carried by a shaft 84 having bearings in a bearing bracket 85 suitably secured to the aforesaid member 70. Connected to one end of the shaft 84 is a flexible shaft 86 which is connected to one end of a shaft 87 supported in bearings formed by a bearing bracket 88 suitably secured to a member 89 which, if desired, may be carried by the aforesaid fixed wall 19 of the dark room. The shaft 87 carries a worm gear 90 which coacts with a segmental rack member 91 suitably secured to a ring 92 oscillatory on a bearing member 93 projecting laterally from the aforesaid member 89.

In any suitable manner, the aforesaid shaft 87 is geared to the armature of a reversible electric motor 94 having extending therefrom conductors 95, 96 and 97 forming the energizing circuits for said motor 94. As indicated, the conductor 95 includes the contacts of a limit switch 98 comprising a movable switch member 99 adapted to be actuated by a pivoted member 100, the conductor 95 extending from said limit switch 98 and terminating in a fixed contact member 95a. The conductor 97 includes the contacts of a limit switch 101 comprising a movable switch member 102 adapted to be actuated by a pivoted member 103, the conductor 97 extending from said limit switch 101 and terminating in a fixed contact member 97a.

The hereinbefore described conductor 96 leads to one terminal of a suitable source of current, the other terminal of which has connected thereto a conductor 104 leading to the respective fixed contacts 104a and 104b. Coactable with the contacts 97a, 104a, is a switch member 105 carrying an actuating button 106, the switch member 105 being biased toward circuit-opening position, as by a spring, or equivalent. Coactable with the fixed contacts 95a, 104b is a switch member 107 carrying an actuating button 108, the switch member 107, the same as the switch member 106, being suitably biased toward circuit-opening position.

Suitably secured to the above described ring 92 is a pointer 110 coactable with scales $s$, $s1$ ... $s7$ formed on a member 111 suitably secured in fixed position, for example, to the aforesaid member 89. As hereinafter described, the scales $s$, $s1$, etc. are utilized by the operator for automatically selecting proper diaphragm openings as defined by the shutter members 79.

Referring to Fig. 1, access to the hereinbefore described camera box 16 may be had by a door 115 which, in a conventional manner, carries the usual suction head, not shown, from which air is withdrawn by way of the conduit 116 under the control of a motor disposed in a housing 117. After the door 115 has been opened and with the suction motor operating, a sensitized memmember S may be placed against the suction openings on the interior door surface whereupon, by action of suction, said sensitized member S is thereafter held in its intended position on said interior door surface. Thereupon, the door 115 may be closed and, as a result, the sensitized member S takes its normal operating position as indicated in Fig. 7.

The hereinbefore described counter mechanisms 55 are of a type well known to the art. Each of them comprises a window with respect to which three or more wheels bearing indicia 1, 2 ... 9, 0 are movable, these wheels, in the form of the invention herein shown, being designated as a "0.1" wheel, a "unit" wheel, a "ten" wheel, etc. Each time that the "0.1" wheel rotates through an angle of 360 degrees, the "unit" wheel is automatically stepped 36 degrees. Similarly, each time that the "unit" wheel rotates through an angle of 360 degrees, the "ten" wheel is stepped 36 degrees. The arrangement is such that each circular band 52 rotates through an angle of 360 degrees each time that the associated "0.1" wheel moves through an angle of 36 degrees. Each band 52, therefore, is calibrated in "hundredths" and "thousandths" as regards the associated "0.1" wheel. Therefore, by observation of a counter mechanism 55 and an associated band 52, a reading may be obtained in five places on the decimal system.

In accordance with the invention, the arrangement is such that the strut 13 and the cross bar 60 move 0.1 inch for each single revolution of the respective "0.1" wheels of the counter mechanisms. Therefore, with each counter mechanism 55 and its associated circular band 52, there may be obtained a reading on the "ten" scale, the "unit" scale, "tenths" of the "unit" scale, "hundredths" of the "unit" scale, and "thousandths" of the "unit" scale.

For each counter mechanism and associated circular band 52, it is assumed that the center of the objective lens Ll is the zero point of reference. Therefore, if the counter mechanism and associated band 52 controlled by the wheel L gives a reading of 82.261, the operator is advised that the center of the objective lens Ll is positioned a distance of 82.261 inches from the sensitized member S. Similarly, if the counter mechanism and associated band 52 controlled by the wheel C gives a reading of 70.310, the operator is advised that the center of the objective lens Ll is positioned a distance of 70.31 inches from the copy board Cl.

Further in accordance with the invention, a solution is obtained of the formula $d = F \times (r+1)$ wherein the unknown $d$ is the distance from the center of the objective lens Ll to the image plane, i. e., the surface of the sensitized member S; wherein $F$ is the focal length of said objective lens Ll; and wherein $r$ is the ratio of enlargement or reduction between the representation-carrying member on the copy board Cl and the latent image thereof to be produced on the sensitized member S.

For the same value of the quantity $r$, a solution is obtained of the formula $$d = \frac{F \times (r+1)}{r}$$

wherein the unknown $d$ is the distance from the center of the objective lens Ll to the copy plane, i. e., the surface of the copy board Cl; wherein $F$ is said focal length of said objective lens Ll; and wherein $r$ is said ratio of enlargement or reduction between the representation-carrying member on the copy board Cl and the latent image thereof to be produced on the sensitized member S.

The solution of the two formulas noted above gives two values for the distance $d$, (1) the distance from the center of the objective lens Ll to the image plane, and (2) the distance from the center of the objective lens Ll to the copy board plane.

The values for the distances $d$ obtained as noted above are tabulated opposite the quantity $r$ and then this table is completed by obtaining other values of the distances $d$ for a large number of assumed fractionally different values of the variable $r$.

With a table of this character at hand, the operator of the camera need be advised only concerning the ratio of enlargement or reduction which is to be effected with respect to a representation-carrying member or object to be attached to the copy board C. In other words, the operator, with knowledge of the quantity $r$, consults his table and then sets the two counter mechanisms in accordance with the values of the distances $d$ opposite the assigned value $r$. This may be accomplished in a relatively simple manner and, when done, the operator may rest assured that the camera is exactly focused and that the image to be produced on the sensitized member M will have exactly the desired dimensions. Therefore, in accordance with my invention, it is unnecessary to use a ground glass for focusing purposes and, likewise, it is unnecessary to measure the image on such ground glass in order to obtain a desired degree of reduction or enlargement.

Accordingly, in view of the foregoing, it follows that the camera of my invention is susceptible of accurate operation and this arises particularly by reason of the fact that it is necessary only to consult a previously prepared table when fixing the position of the objective lens and the copy board.

It will be understood that the table noted above may be constructed otherwise than as herein stated. Thus, a constant may be added to each value of the distance $d$ and the counter mechanisms set accordingly. Or, for example, the distances $d$ may be set forth in each instance as the distance from the sensitized member S to the objective lens, and from said sensitized member S to the copy board C.

After the objective lens Ll and the copy board Cl have been positioned in proper focusing relation as described above, the operator presses the button 66 to thereby move the switch member 65 into engagement with the adjacent contact members 63a, 64a and close the circuit through the winding 68 and the lamps 62.

While the winding 68 remains deenergized, the shutter 76 is in its lowermost position wherein it entirely closes the light path through the objective lens Ll. When said winding 61 is energized, the armature 78 thereof is attracted to thereby move the shutter 76 in a counter-clockwise direction, Fig. 5, to and through the position thereof shown in said Fig. 5, the shutter position last noted being merely a transition position and not a stationary shutter position.

Simultaneously as the shutter 76 is thus moved to position opening the light path, the lamps 62 are energized to thereby illuminate the object on the copy board Cl from which a projecting light beam is passed through the objective lens Ll to the sensitized member S. The operator holds the button 66 in its depressed position for as long a period as the exposure is to continue. As soon as the exposure period is completed, the button 66 is released whereupon the circuits of the winding 68 and the lamps 62 are opened. It will be understood that a suitable time switch may be utilized to hold the switch member 65 in closed circuit relation, such time switch being automatically operable after a predetermined period has elapsed to open the circuit through the lamps 62 and winding 68.

As will be understood, in view of the description hereinbefore stated, the rings 82 and 92 are moved simultaneously under the control of the motor 94 by power transmitted along the described mechanical connection which is shown in Fig. 5. The ring 92 carries a pointer which coacts with a scale 57 of the chart 111. The arrangement is such that, when the pointer 110 is in indicating position with respect to f11, the diaphragm opening defined by the shutters 79 has a value f11; similarly, when said pointer 110 is in indicating position with respect to f16, the diaphragm opening defined by the shutters 79 has a value f16; and so on.

When the operator desires to increase the diaphragm opening defined by the shutter members 79, the switch member 107, Fig. 5, is closed on the contacts 95a, 104b to thereby close the circuit through one winding of the motor 94 and thereby effect movement in a counter-clockwise direction, Fig. 5, of the ring 92. Simultaneously, by power transmitted along the described mechanical connection the ring 82 is moved in counter-clockwise direction, Fig. 5, and, by reason of the fact that the two sets of worm gears and rack segments are duplicates, it follows that the rings 92 and 82 partake of equal movements.

When the operator desires to decrease the aforesaid diaphragm opening, the switch member 107, Fig. 5, is closed on the contacts 97a, 104a to thereby close the circuit through the other winding of the motor 94 and thereby effect movement in a clockwise direction, Fig. 5, of the ring 92. Simultaneously, the ring 82 partakes of equal clockwise movement, Fig. 5.

In the sensitized member S is to be a line cut negative, the operator, by control of the motor 94, may cause the pointer 110 to move into indicating position with respect to the desired f value of the scale s7. As a result, the ring 82 so moves the shutter members 79 that they define a diaphragm opening corresponding with said f value. A single exposure of proper time interval completes the operation and this exposure may be effected by operation of the switch button 66 in the manner hereinbefore described.

If the sensitized member is to be a half tone negative and if the exposure is to be 100%, i. e., if the image is to be dimensionally the same as the object on the copy board C1, the operator, by reference to his table, operates the wheels C and L to move the objective lens L1 and copy board C1 into proper focusing relation. Then, the operator, by proper control of the buttons 106 or 108, may cause the pointer 110 to move into indicating position with respect to the index 100 on the scale s1 and, by operation of the button 66, effects the "high light" exposure. Thereupon, the pointer 110 may be moved into indicating position with respect to the index 100 on the scale s5, for example, whereupon the "detail" exposure is effected. Finally, the pointer 110 may be moved into indicating position with respect to the index 100 on the scale s3, for example, and thereafter the "flash" exposure is effected.

If the sensitized member is to be a half tone negative and if the exposure, for example, is to be 80%, i. e., if the image is to have 80% of the area of the object on the copy board C1, the operator, by reference to his table, operates the wheels C and L to move the objective lens L1 and copy board C1 in proper focusing relation. Then, the operator may cause the pointer 110 to move into indicating position with respect to the index 80 on the scale s1 whereupon the "high light" exposure is effected. Thereupon, the pointer 110 may be moved into indicating position with respect to the index 80 on the scale s5, for example, and then the "detail" exposure is effected. Finally, the pointer 110 may be moved into indicating position with respect to the index 80 on the scale s3, for example, whereupon the "flash" exposure is effected.

As indicated, the scales s, s1 ... s6 comprise various other index marks, such as index mark 70, index mark 120, etc., and it will be understood that the operator sets the pointer 110 in succession at the proper index marks when effecting the various exposures for either reductions or enlargements as the case may be.

Although not shown on the drawings, it will be understood that the herein described camera box 16 comprises means for introducing into the path of the projecting light beam various screens which should be used as experience dictates when effecting the various exposures. Further, it will be understood that, depending on experience and experiment, the operator uses the scales s, s1 ... s6 in various ways and relations and times the various exposures as desired in order to obtain the desired result, namely, a negative of the desired character.

An important feature of the invention involves the relation which the operator may conveniently establish between the diaphragm openings for a set of "high light," "detail" and "flash" exposures and the percentage reduction or enlargement of the object on the copy board C1 as the case may be. Thus, for example, if the negative is to be 80% as regards the size of said object, the various diaphragm openings should be and readily are 80% of the assumed 100% lens openings, respectively.

Referring to Fig. 6, the scale s7 is plotted, as well understood in the art, from data obtained by computing different values for f in the formula $$f = \frac{F}{D}$$

where F is a constant, i. e., the lens focal length and D is a variable, i. e., different diameters of the lens diaphragm opening.

The scale s may be formed in the following manner. An arcuate line l is formed having the same center as was used in forming the arcuate line of the scale s7. Some suitable f value such, for example, as f19 is connected by a straight line extending to the aforesaid center of the arcuate line l and the intersection of this straight line with said arcuate line l is denoted 100. This is assumed as a 100% lens opening at f19.

The motor 94 may now be operated to move the rings 82, 92 in a clockwise direction, Fig. 5, and this movement is continued until, by measurement effected thereon, the area of the diaphragm opening defined by the shutter members 79 is found to be 90% of said assumed 100% lens opening at f19. At this time, with the motor non-operative, the position of the indicating side of the pointer 110 is marked on the arcuate line l. This gives the desired index mark 90 of the scale s. In a corresponding manner, the various other 100-minus index marks may be plotted on said scale s.

The other scales s2, s3, s4, s5 and s6 may be formed in generally the same manner as described above with respect to the scale s. That is, a plurality of spaced arcuate lines l may be formed on the chart 11, each of these lines having the same center as was used in forming the arcuate line of the scale s7. Thereupon, 100% lens openings for the various scales are assumed as follows: For the scale s1—f22; for the scales s2 and s5—f32; for the scale s3—f64; for the scale s4—f27 approximately; and for the scale s6—f45. Thereafter, the various 100-minus index marks for all of the scales last named may be established in the general manner described above with respect to the scale s.

As regards the 100-plus index marks on the scales s, s1 ... s6, the same procedure may be followed with respect thereto as was followed with respect to the 100-minus index marks. However, experience has demonstrated that such positioning of the 100-plus index marks does not yield entirely satisfactory results. As a result of experimentation, assuming that the chart of Fig. 6 is drawn approximately to scale, I have determined that the 100-plus index marks as shown on said Figs. 5 and 6 are properly positioned so that satisfactory results are obtained when setting the pointer 110 by said 100-plus index marks in generally the same manner as previously described with respect to the 100-minus index marks.

In lieu of the mechanical method described above for plotting the 100-minus index marks for the scales s, s1 ... s6, it shall be understood that the positions of said index marks may be computed by graphical methods.

Although I have described the preferred manner of operating the camera of my invention, it shall be understood that my invention is not to be thus limited in all respects.

For example, if desired, the focusing operation may be effected by disposing a ground glass in the plane of the sensitized member S and thereafter proceeding in the known manner. Under such circumstances, the operator would dispense with the set of tables which accompanies the camera.

Further, it will be understood that the described system of controlling the lamps 62 and shutter 76 is not to be limited to a camera otherwise of the character herein described.

A particularly important feature of my invention resides in the fact that the various control and indicating mechanisms are grouped in the dark room for convenient operation and observation by the operator. The focusing operation, change of diaphragm opening, control of the light path by the shutter 76 and illumination of the lamps 62 are all effected by the operator while he is in the dark room at the end of the camera containing the sensitized member S. Excursions from the dark room are not required for ordinary operation. This, in addition to the various automatic and semi-automatic features of the invention, are features new and of distinct importance to the art.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In a camera, a plurality of supporting members, a copy board carried by one of said supporting members, an objective lens carried by another of said supporting members, and means for moving one of said supporting members to focusing position, said means comprising a rotatable wheel or the like, said means comprising speed-changing mechanism operative to move said last named supporting member either at high speed or low speed, the gear ratio of said speed-changing mechanism being controlled by the position of said wheel axially on its supporting shaft.

2. In a camera, a plurality of supporting members, a copy board carried by one of said supporting members, an objective lens carried by another of said supporting members, and means for moving one of said supporting members to focusing position, said means comprising a rotatable wheel or the like, said means comprising speed-changing mechanism operative to move said last named supporting member either at high speed or low speed, the gear ratio of said speed-changing mechanism being controlled by the position of said wheel axially on its supporting shaft, said wheel being adapted to occupy a position on said shaft wherein it is incapable of effecting movement of said last named supporting member.

3. In a camera, a copy board, an objective lens, means for moving said copy board with respect to said objective lens, a device for actuating said first named means, means for moving said objective lens with respect to said copy board, a device for actuating said second named means, shutters associated with said objective lens to form a diaphragm opening, means for moving said shutters, a device for actuating said third named means, a light source for illuminating an object on said copy board, means for energizing said light source, and a device for actuating said fourth named means, all of said devices being grouped for convenient operation at the end of the camera adapted to receive a sensitized member.

4. In a camera, a copy board, an objective lens, means for moving said copy board with respect to said objective lens, a device for actuating said first named means, means for moving said objective lens with respect to said copy board, a device for actuating said second named means, shutters associated with said objective lens to form a diaphragm opening, means for moving said shutters, a device for actuating said third named means, a shutter member for obstructing the light path through said objective lens, means for moving said shutter member from said path, and a device for actuating said fourth named means, all of said devices being grouped for convenient operation at the end of the camera adapted to receive a sensitized member.

5. In a camera, a copy board, an objective lens, means for moving said copy board with respect to said objective lens, a device for actuating said first named means, means for moving said objective lens with respect to said copy board, a device for actuating said second named means, shutters associated with said objective lens to form a diaphragm opening, means for moving said shutters, a device for actuating said third named means, a shutter member for obstructing the light path through said objective lens, means for moving said shutter member from said path, and a device for actuating said fourth named means, all of said devices being grouped for convenient operation at the end of the camera adapted to receive a sensitized member, and means forming a dark room in which said devices and said end of the camera are received.

6. In a camera arrangement of the character described, a camera having one end thereof extending into a dark room, a plurality of supporting members, a copy board carried by one of said supporting members, an objective lens carried by another of said supporting members, and means for moving one of said supporting members to focusing position, said means comprising speed-changing mechanism operative to move said last named supporting member either at high speed or low speed, said means and said speed-changing mechanism being disposed in said dark room.

7. In a camera arrangement of the character described, a camera having one end thereof extending into a dark room, a plurality of supporting members, a copy board carried by one of said supporting members, an objective lens carried by another of said supporting members, means for moving one of said supporting members to focusing position, said means comprising speed-changing mechanism operative to move said last named supporting member either at high speed or low speed, and means comprising a counter mechanism for indicating the position of said one supporting member, said first named means, said speed-changing mechanism and said counter mechanism being disposed in said dark room.

8. In a camera, a copy board, an objective lens, means for moving said copy board with respect to said objective lens, a device for actuating said first named means, means for moving said objective lens with respect to said copy board, a device for actuating said second named means, shutters associated with said objective lens to form a diaphragm opening, means for moving said shutters, a device for actuating said third named means, a pointer and a cooperative chart, means whereby said last named device moves said pointer with respect to said chart, a light source for illuminating an object on said copy board, means for energizing said light source, and a device for actuating said fourth named means, all of said devices being grouped for convenient operation at the end of the camera adapted to receive a sensitized member.

9. In a camera, a copy board, an objective lens, means for moving said copy board with respect to said objective lens, a device for actuating said first named means, means for moving said objective lens with respect to said copy board, a device for actuating said second named means, shutters associated with said objective lens to form a diaphragm opening, means for moving said shutters, a device for actuating said third named means, a pointer and a cooperative chart having a plurality of different scales thereon, means whereby said last named device moves said pointer with respect to said chart in correspondence with movement of said shutters, a light source for illuminating an object on said copy board, means for energizing said light source, and a device for actuating said fourth named means, all of said devices, said pointer and said chart being grouped for convenient operation in a dark room at the end of the camera adapted to receive a sensitized member.

10. In a camera, a copy board, an objective lens, means for moving said copy board with respect to said objective lens, a device for actuating said first named means, means for moving said objective lens with respect to said copy board, a device for actuating said second named means, shutters associated with said objective lens to form a diaphragm opening, means for moving said shutters, a device for actuating said third named means, a pointer and a cooperative chart, means whereby said last named device moves said pointer with respect to said chart, a light source adapted to be energized to illuminate an object on said copy board, a shutter member for obstructing the light path through said objective lens, means for moving said shutter member from said path, and a device for actuating said fourth named means, all of said devices, said pointer and said chart being grouped for convenient operation at the end of the camera adapted to receive a sensitized member.

11. In a camera, a copy board, an objective lens, means for moving said copy board with respect to said objective lens, a device for actuating said first named means, means for moving said objective lens with respect to said copy board, a device for actuating said second named means, shutters associated with said objective lens to form a diaphragm opening, means for moving said shutters, a device for actuating said third named means, a pointer and a cooperative chart having a plurality of different scales thereon, means whereby said last named device moves said pointer with respect to said chart in correspondence with movement of said shutters, a light source adapted to be energized to illuminate an object on said copy board, a shutter member for obstructing the light path through said objective lens, means for moving said shutter member from said path, and a device for actuating said fourth named means, all of said devices, said pointer and said chart being grouped for convenient operation in a dark room at the end of the camera adapted to receive a sensitized member.

12. In a camera, a copy board, an objective lens, means for moving said copy board with respect to said objective lens, a device for actuating said first named means, means for moving said objective lens with respect to said copy board, a device for actuating said second named means, shutters associated with said objective lens to form a diaphragm opening, means for moving said shutters, a device for actuating said third named means, a pointer and a cooperative chart having a plurality of different scales thereon, means whereby said last named device moves said pointer with respect to said chart in correspondence with movement of said shutters, a light source for illuminating an object on said copy board, a shutter member for obstructing the light path through said objective lens, means for moving said shutter member from said path and for simultaneously energizing said light source, and a device for actuating said fourth named means, all of said devices, said pointer and said chart being grouped for convenient operation in a dark room at the end of the camera adapted to receive a sensitized member.

MICHAEL ANNICK.